United States Patent
Hilpert et al.

(10) Patent No.: US 8,392,557 B2
(45) Date of Patent: Mar. 5, 2013

(54) ANALYZING A COMMUNICATION PERFORMANCE OF AN IED

(75) Inventors: Gunnar Hilpert, Kuessaberg (DE); Michael Obrist, Untersiggenthal (CH); Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 390 days.

(21) Appl. No.: 12/857,196

(22) Filed: Aug. 16, 2010

(65) Prior Publication Data

US 2011/0047264 A1 Feb. 24, 2011

(30) Foreign Application Priority Data

Aug. 18, 2009 (EP) .................................... 09168031

(51) Int. Cl.
G06F 15/173 (2006.01)
(52) U.S. Cl. ......... 709/224; 709/203; 709/220; 709/223
(58) Field of Classification Search .................. 709/223, 709/224
See application file for complete search history.

(56) References Cited

U.S. PATENT DOCUMENTS

| | | | |
|---|---|---|---|
| 8,250,198 B2 * | 8/2012 | Zhang et al. .................. 709/223 |
| 2002/0120727 A1 | 8/2002 | Curley et al. | |
| 2005/0289395 A1 | 12/2005 | Katsuyama et al. | |
| 2007/0195797 A1 | 8/2007 | Patel et al. | |
| 2008/0235346 A1 | 9/2008 | Wei | |
| 2009/0070062 A1 | 3/2009 | Kirrmann et al. | |

FOREIGN PATENT DOCUMENTS

| | | |
|---|---|---|
| EP | 1 610 495 A1 | 12/2005 |
| EP | 1 850 142 A1 | 10/2007 |

OTHER PUBLICATIONS

European Search Report for EP 09168031.4 dated Jan. 21, 2010.
"Communication Networks and Systems in Substations—Part 8-1: Specific Communication Service Mapping (SCSM)—Mappings to MMS (ISO 9506-1 and ISO 9506-2) and to IOS/IEC 8802-3", IEC 61850-8-1:2004(E) (140 pages).
"Communication Networks and Systems in Substations—Part 9-2: Specific Communication Service Mapping (SCSM)—Sampled Values over ISO/IEC 8802-3", IEC 61850-9-2:2004(E) (34 pages).
"Electric Railway Equipment—Train Bus—Part 1: Train Communication Network, Part 2: Train Communication Network Conformance Testing", IEC 61375-1:2007(E) and IEC 61375-2:2007(E), (34 pages).

* cited by examiner

*Primary Examiner* — Michael Won
(74) *Attorney, Agent, or Firm* — Buchanan Ingersoll & Rooney PC

(57) ABSTRACT

A communication stack performance of an Intelligent Electronic Device (IED) is analyzed in a communication network of a Substation Automation (SA) system. The IED processes network messages that are transferred with, or belonging to, a specific configurable SA communication service. A plurality of application level scenarios corresponding to a high communication load is executed. Among all network messages captured or intercepted during the scenario, the network messages destined to the IED and sent by the IED in response are identified. A number of the identified messages, a number of specific communication protocol elements or data items related to a service-specific property, and a number of changed protocol elements, which are indicative of an SA event, for which the value of the data item has changed compared to the value of the same data item in a previous message, are determined. An IED-intrinsic processing time of the identified messages is likewise determined, based on which parameter values of a service specific processing time model are calculated.

14 Claims, 1 Drawing Sheet

ANALYZING A COMMUNICATION PERFORMANCE OF AN IED

RELATED APPLICATION

This application claims priority under 35 U.S.C. §119 to European Patent Application No. 09168031.4 filed in Europe on Aug. 18, 2009, the entire content of which is hereby incorporated by reference in its entirety.

FIELD

The present disclosure relates to the field of Process Control systems such as Substation Automation systems having a standardized configuration representation.

BACKGROUND INFORMATION

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation (SA) system. The SA system includes secondary devices, such as Intelligent Electronic Devices (IED) which are responsible for protection, control and monitoring of the primary devices. The secondary devices may be hierarchically assigned to a station level or a bay level of the SA system. The station level can include a supervisory computer, which has an Operator Work Station (OWS) with a Human-Machine Interface (HMI) and runs a station-level Supervisory Control And Data Acquisition (SCADA) software, as well as a gateway that communicates the state of the substation to a Network Control Centre (NCC) and receives commands from the NCC. IEDs on the bay level, which are also termed bay units, in turn are connected to each other as well as to the IEDs on the station level via an inter-bay or station bus primarily serving the purpose of exchanging commands and status information.

Secondary devices on a process-level of the SA system can include, for example, conventional Instrument Transformers (IT) for voltage (Voltage Transformers VT) and current (Current Transformers CT) measurement, gas density or pressure sensors, as well as contact probes for sensing switch and transformer tap changer positions. Furthermore, exemplary intelligent sensors such as non-conventional electronic or optical sensors for current or voltage can include an Analog to Digital (A/D) converter for sampling of analog signals, and can be connected to the bay units via a dedicated bus, or a dedicated communication service on a common communication system, as part of an intelligent process interface. The intelligent process interface replaces the conventional hardwired process interface that connects conventional ITs in the switchyard, via dedicated copper wires and junction boards, to different bay units which individually sample the analog signals from the ITs.

A communication standard for communication between the secondary devices of a substation has been introduced by the International Electrotechnical Committee (IEC) as part of the standard IEC 61850 entitled "Communication Networks and Systems in Substations". For non-time critical report messages, section IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet and/or RS-232C as physical media.

For time-critical event-based messages, such as trip commands, for example, IEC 61850-8-1 specifies the Generic Object Oriented Substation Events (GOOSE) directly on the Ethernet link layer of the communication stack. For very fast periodically changing signals at the process level, such as measured analog voltages or currents, section IEC 61850-9-2 specifies the Sampled Value (SV) service, which, similar to GOOSE, builds directly on the Ethernet link layer. Hence, part 9 of the standard defines a format to publish, as multicast messages on an industrial Ethernet, digitized measurement data from current or voltage sensors on the process level as a substitute to traditional copper wiring.

SA systems based on IEC61850 are configured by means of a standardized configuration representation or formal system description called Substation Configuration Description (SCD). An SCD file comprises the logical data flow between the IEDs on a "per message" base, i.e. for every message source, a list of destination or receiver IEDs, the message size in terms of data set definitions, as well as the message sending rates for all periodic traffic such as reports, GOOSE, and SV.

As mentioned, IEC 61850 introduces different communication services for Substation Automation applications. A predictable and deterministic communication time is desired for at least the real time safety and protection related functions among these applications. However, the communication load can become an issue for large process control systems with up to 500 IEDs, for example, communicating among each other and with increased real-time critical communication needs due to multicast communication traversing the entire system. This is especially true for multicast GOOSE and SV messages according to IEC 61850, and has an impact on the entire communication system, e.g., the behaviour of a switch based Ethernet, as well as on individual message transmitters and receivers. While the performance of a communication stack of a transceiver can depend on computing (e.g., CPU processing) performance and quality of the implementing software, other causes such as application tasks sharing the CPU, or a connection to the application via queues or shared memory, might have an impact on the communication stack processing time as well.

If a mission-critical application is dependent on guaranteed real-time performance, the choice can be a deterministic protocol where the communication behavior can be calculated in advance. Examples are periodic busses as defined in, for example, IEC 61375 (Multi-function Vehicle Bus MVB) or the WorldFIP real time fieldbus. According to these, a maximum possible amount of data is transferred permanently, so that the fixed communication time is always according to the maximum load possible. However, the latter does not apply to the Ethernet based non-periodic bus adopted by IEC 61850. Here, switches are used to remove the effect of collisions, and effects of queuing in the switches could be expected in case of high communication load. On the other hand, in an Ethernet system with a capacity of 100 MB/s or even 1 GB/s, the bottle necks, for most current SA applications, reside in the end devices (IEDs) and not in the switch based Ethernet system.

In EP 1610495, fault analysis for analyzing a cause of a performance fault on a communication network is performed during execution of a communication application. For this purpose, messages or packets are captured, and ongoing message transfers as well as times of message appearance on the bus are logged, such as during high load situations or when forcing certain request/response schemes. Based on the logged times, round trip times and message throughput can be determined. However, this approach is only valid for the investigated scenarios, and only limited conclusions for other scenarios can be drawn from them. In addition, the qualityof-service analysis is restricted to the communication level, independent of the effect of an event at an application or function level.

The principles and methods of the present disclosure are by no means restricted to use in substation automation, but are likewise applicable to other Process Control systems with a standardized configuration description. For example, it has to be noted that IEC 61850 is also an accepted standard for Hydro power plants, Wind power systems, and Distributed Energy Resources (DER).

SUMMARY

An exemplary embodiment provides a method of analyzing a communication performance of an Intelligent Electronic Device (IED) configured to process network messages transferred with a Substation Automation (SA) communication service. The exemplary method includes, during each of a plurality of SA scenarios: identifying, by an analyzer (23), a number $n_1$ of network messages related to the SA communication service and processed by the IED; determining, by the analyzer, a number $n_2$ of specific communication protocol elements within the number $n_1$ of identified network messages; determining, by the analyzer, a number $n_3$ of elements with a changed data value within the number $n_2$ of specific communication protocol elements; determining, by the analyzer, a processing time $t_p$ of the identified network messages at the IED; and calculating, by the analyzer, SA communication service-specific parameters $k_1, k_2, k_3$ of a processing time model including the specific protocol element, based on the numbers $n_1, n_2, n_3$ and the processing time $t_p$ for each of the plurality of SA scenarios.

An exemplary embodiment provides an analyzing tool for analyzing a communication performance of an Intelligent Electronic Device (IED) configured to process network messages transferred with a Substation Automation SA communication service. The analyzing tool includes a control unit configured to, during each of a plurality of SA scenarios: identify a number $n_1$ of network messages related to the SA communication service and processed by the IED; determine a number $n_2$ of specific communication protocol elements within the number $n_1$ of identified network messages; determine a number $n_3$ of elements with a changed data value within the number $n_2$ of specific communication protocol elements; determine a processing time $t_p$ of the identified network messages at the IED; and calculate SA communication service-specific parameters $k_1, k_2, k_3$ of a processing time model including the specific protocol element, based on the numbers $n_1, n_2, n_3$ and the processing time $t_p$ for each of the plurality of SA scenarios.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings, and their meanings, are listed in summary form in the list of designations. In principle, identical parts and/or identically functioning parts are provided with the same reference symbols throughout the drawings.

DETAILED DESCRIPTION

Figure 1:
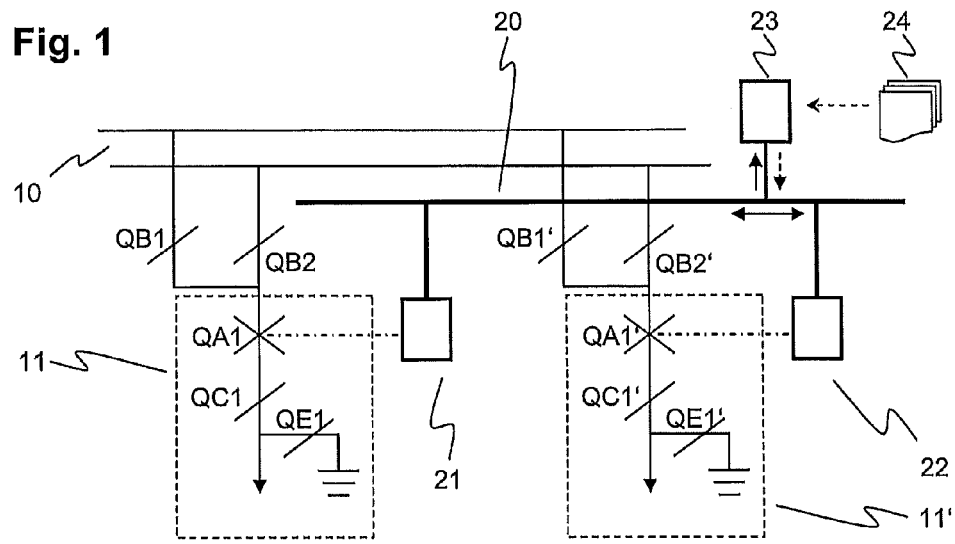
FIG. 1 depicts an excerpt of a substation and a corresponding Substation Automation (SA) system, according to an exemplary embodiment of the present disclosure.

Exemplary embodiments of the present disclosure predict a real-time, or operational, communication performance of a communication network of a Substation Automation (SA) system with a plurality of communicating Intelligent Electronic Devices (IEDs). Exemplary embodiments of the present disclosure provide a method of analyzing a communication stack performance of a single IED, and an analyzing tool which achieve these objectives.

According to an exemplary embodiment of the present disclosure, a communication stack performance of an IED configured to process network messages that are transferred with, or belonging to, a specific configurable Substation Automation communication service is analyzed by an analyzer. A plurality of realistic application level scenarios corresponding to a high communication load, such as those triggered by a fault event, are executed. Among all network messages captured or intercepted during the scenarios, the network messages destined to the IED and sent by the IED in response are identified. A number of the identified messages, a number of specific communication protocol elements or data items related to a service-specific property, and a number of changed protocol elements, indicative of an SA event, for which the value of the data item has changed as compared to the value of the same data item in a previous message, are determined. An IED-intrinsic processing time of the identified messages is likewise determined, based on which parameter values of a service specific processing time, or communication, model are calculated.

In accordance with an exemplary embodiment, a plurality of SA communication services are analyzed and modelled in common. Each SA communication service may independently include processing time model parameters for respective protocol elements up to a desired degree of granularity or detail.

In accordance with another exemplary embodiment, an SA scenario is emulated during testing or commissioning of a specific SA system configuration, by means of a dedicated synthesizer generating the corresponding network messages destined to the IED under test. The synthesizer may be identical with the analyzer according to an exemplary embodiment. Alternatively, a burst of messages corresponding to the scenario may be triggered by simulating a fault event at the process level. In other words, the analysis of the communication stack performance of the IED is performed well before the actual occurrence of a fault event in a real substation. The latter, however, may be exploited by recording the corresponding network messages in view of verification or fine-tuning of the model parameters during operation of the SA system.

Accordingly, exemplary embodiments of the present disclosure provide a mechanism of capturing messages in several different high load situations and evaluating the message registration times on the bus. By using the defined application level description of all data and communication messages of the IEC 61850 standard, and applying a fine grain communication model, some characteristic stack and communication model related figures are calculated. The proposed method of assessing the communication stack performance of an IED considers the IED as a black box, and analyzes its performance in a semi-heuristic way based on the properties of the underlying IEC 61850 protocols. Useful parameters can thus always determined for a specific project dependent SA configuration. The resulting model then allows performance calculations for other load scenarios formulated in terms of application level load.

The present disclosure also relates to a non-transitory computer-readable recording medium having a computer program recorded thereon for controlling one or more processors of an IED or an analysing tool or other device adapted to be connected to a communication network of an SA system and configured to store a standardized configuration representation of the SA system.

FIG. 1 shows a single line diagram of a part or section of an exemplary substation or switchyard together with examples of Substation Automation (SA) or secondary equipment. The substation includes a double bus bar configuration with two bus bars 10, each of them feeding two bays 11, 11' via disconnectors QB1, QB2, respectively. Each bay 11, 11' respectively includes a circuit breaker QA1, QA1', a disconnector QC1, QC1' and an earthing switch QE1, QE1'. The corresponding excerpt of the SA system depicts, in bold lines, a communication network 20 connected to two Intelligent Electronic Devices (IED) 21, 22, which both host logical nodes of class CSWI (switch control). According to an exemplary embodiment, each logical node can be allocated to one of the aforementioned circuit breakers QA1, QA1' as indicated by the dash-dot lines. Analyzer 23 is connected to the network 20 and is configured to intercept all network messages or packets to and from IED 21. This network traffic may emanate from a real SA process, or be simulated by a dedicated synthesizer. For example, in case a substation specific SCL file 23 including a Substation Configuration Description (SCD) of the SA system is imported into the analyzer 23, the analyzer 23 may itself generate and transmit network messages to the IED 21 under test. According to an exemplary embodiment, the analyzer 23 can include a control unit (e.g., a processor configured to execute computer-readable recorded on a non-transitory computer-readable recording medium, such as a non-volatile memory). The control unit of the analyzer 23 is configured to perform the operative functions of the analyzer 23 according to the exemplary embodiments described herein.

Figure 2:
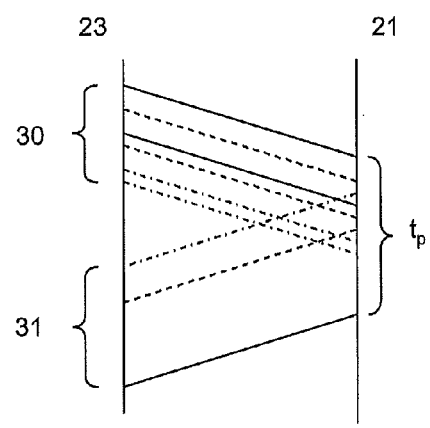
FIG. 2 depicts a sequence of messages exchanged over a SA communication network, according to an exemplary embodiment of the present disclosure.

FIG. 2 depicts a burst, e.g., an exemplary sequence of messages 30 transmitted from analyzer 23 to IED 21. In the exemplary illustration of FIG. 2, time is progressing from top to bottom in the drawing, each diagonal line represents a single message, and different dash styles distinguish between messages according to different SA communication services. The IED 21 in turn transmits a number of response messages 31, wherein the time $t_p$ elapsed between the first message received and the last message transmitted by the IED 21 is determined by the analyzer 23. For this purpose, the analyzer 23 may also take into account the pure transmission time on the bus as known from a message length and Ethernet bit rate.

Figure 3:
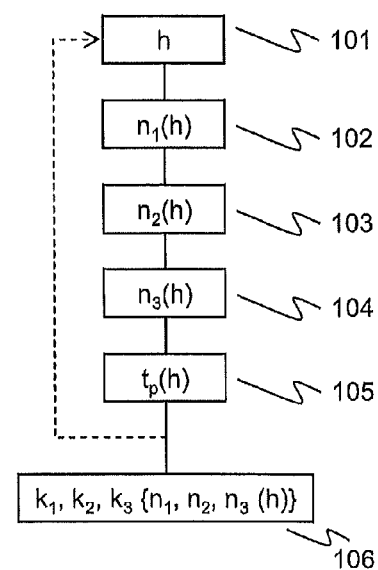
FIG. 3 is a flowchart illustrating steps of analyzing a communication performance of an IED according to an exemplary embodiment of the present disclosure.

FIG. 3 is a flowchart illustrating steps in a process of analyzing, in the analyzer 23, a communication performance of an IED according to an exemplary embodiment of the present disclosure. In step 101, a first communication scenario h=1 is executed. In step 102, a number $n_1$(h) of network messages related to a SA communication service and processed by the IED is identified. In step 103, a number $n_2$(h) of specific communication protocol elements within the number $n_1$ of identified network messages is determined. In step 104, a number $n_3$(h) of elements with a changed data value within the number $n_2$ of specific communication protocol elements is determined. In step 105, a processing time $t_p$(h) of the identified network messages at the IED is determined. Following this, a next scenario h=h+1 is executed. Finally, in step 106, based on the numbers $n_1$, $n_2$, $n_3$ and the processing time $t_p$ for each of the plurality of SA scenarios, SA communication service-specific parameters $k_1$, $k_2$, $k_3$ of a processing time model including the specific protocol element are calculated.

The communication stack processing time can depend on the SA communication service or message protocol type, such as MMS (Manufacturing Message Specification) for reporting, GOOSE (Generic Object Oriented Substation Events) and SV (Sampled Values), and the different protocol elements or entities to be processed. Within IEC 61850 and for the SA communication services providing spontaneous sending of data, these protocol elements can include the handling of 1) entire messages, 2) the data items within an individual message, and 3) events, i.e. data items with changed values. These elements are different for different communication services, with, for example, the number of events equaling the number of data items for reporting and mostly for SV, however typically not for GOOSE, and the related processing times are generally independent of each other within one single service.

Three exemplary but by no means exhaustive refinements of the processing time model disregarded in the embodiment below for the sake of simplicity are based on the following observations. (i) The handling time for an event may depend on the data type of the value. (ii) Message sending and receiving processing times by/at the IED may be distinguished. (iii) Services with different priorities may be handled differently; hence considering priority group differences additionally to communication service type differences would allow a more fine grain processing time evaluation.

A linear processing time model specifies, for a particular SA communication service j involving messages of a particular message protocol type, the corresponding processing time $t_p^j$ for a burst of messages as:

$$t_p^j = \Sigma_i (n_i^j * k_i^j) = k_1^j * msgno^j + k_2^j * datano^j + k_3^j * eventno^j,$$

where:

$t_p^j$: time for processing the messages of the protocol type specific for service j;

msgno ($=n_1^j$): number of messages of the protocol type in the burst;

datano ($=n_2^j$): number of data items in the messages (generally independent from $n_1^j$, e.g., the number of data items per message may vary within a message type); and eventno ($=n_3^j$): number of changed data values in the data items According to an exemplary embodiment, in order to calculate the communication service specific constants $k_i^j$, for a particular IED, an analyzer connected to the same SA communication network as the IED observes the network traffic to and from the IED, including both multicast messages as well as messages explicitly addressed to the IED. The analyzer determines the time $t_p$ elapsed between the first message of a burst received by the IED and the last message transmitted by the IED in the burst. Generally, all kinds of services are present in a burst, and the length of the time slot $t_p$ can be assumed to contain a contribution from each service, i.e. $t_p = \Sigma_j t_p^j$. Due to the serial processing of the different messages a predominance of one message type or the order of the messages does not matter. On the other hand, in order to not overestimate the service specific constants $k_i^j$, the communication stack should be continuously processing messages, thereby involving means for an appropriate queuing of the messages to be processed.

The analyzer further determines the type of each message captured, counts the number $n_1$ of messages per type, and inspects each message to determine the number of data items $n_2$ and events $n_3$ per type. In this context, the analyzer may verify that no message is lost in between the analyzer and the IED. The analyzer can perform this operation by additionally evaluating receiver supervision messages from the IED counting lost input messages, or message sequence counts for each IEC 61850 service type in order to identify messages sent by the IED but not arriving at the analyzer. On the other hand, correct handling of a loss of an event at application level could involve, e.g. for GOOSE and SV, a special IED application returning any received data change (event).

According to an exemplary embodiment, a burst of messages provoked by a bulbar-trip can last for approximately 100 ms and include supervision alarms, protection trips, switch position changes and measurement changes. Per bay, this may result in 5 to 10 report messages and 6 to 12 GOOSE messages within 12 ms and in addition to the 4000 msg/s periodic SV traffic for each of two VTs in the bay. According to an exemplary embodiment, a burst scenario may be exploited by the analyzer by determining a burst start from a specific event/message, and a burst end from a continued silence of 10 ms or more, for example. Alternatively, any sequence of messages with a configurable maximum delay of a few milliseconds between successive messages, and being continuously processed by the communication stack, may be evaluated by the analyzer.

By providing independent measurements during high load time slots (e.g. nine distinct burst scenarios with the numbers $n_i^j(h)$ (h=1 . . . 9) forming an invertible matrix of maximum rank for a processing time model with three services and three constants each) the appropriate constants $k_i^j$ can be calculated. As application dependent reaction times are not investigated here, the calculated values can be assumed to be independent of the application or function level, and hence the resulting processing time model can later be used for other load scenarios in the same SA system configuration, for example, to estimate the load effect on the IED in advance.

The above measured application related numbers can be used in turn to define or verify assumed application related scenarios like normal load, and certain worst case situations. In particular, knowing the normal or steady state load in form of application level data changes, which can be transformed into a data set and service scenario due to the formal description on how they are communicated, the analyzer can calculate a steady state load based on the processing time model. Assuming msgno, datano and eventno as averages per second, a straightforward check of whether or not the resulting total processing time exceeds 1 sec, for example, can indicate whether or not the IED is operating stably.

Finally, if the above analysis is performed for the entire SA system, the resulting detailed models can be used as a base to calculate different global measures on different levels of the IEC 61850 model for the different IEDs such as:

(i) a message rate per access point, event rate per access point (if several Logical Nodes are implemented per IED);

(ii) a relationship of changed data items versus sent data items (interesting especially for GOOSE and SV) and versus sent messages;

(iii) an event rate per access point and per communication service type;

(iv) a processing time per data type (e.g., IEC 61850 common data class); and (v) event rates per data item.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 bus bar
11 bay
20 communication network
21 first Intelligent Electronic Device (IED)
22 second IED
23 analyzer
24 SCL file

What is claimed is:

1. A method of analyzing a communication performance of an Intelligent Electronic Device (IED) configured to process network messages transferred with a Substation Automation (SA) communication service, comprising, during each of a plurality of SA scenarios:
   identifying, by an analyzer, a number $n_1$ of network messages related to the SA communication service and processed by the IED;
   determining, by the analyzer, a number $n_2$ of specific communication protocol elements within the number $n_1$ of identified network messages;
   determining, by the analyzer, a number $n_3$ of elements with a changed data value within the number $n_2$ of specific communication protocol elements;
   determining, by the analyzer, a processing time $t_p$ of the identified network messages at the IED; and
   calculating, by the analyzer, SA communication service-specific parameters $k_1, k_2, k_3$ of a processing time model including the specific protocol element, based on the numbers $n_1, n_2, n_3$ and the processing time $t_p$ for each of the plurality of SA scenarios.

2. The method according to claim 1, wherein the IED is configured to process network messages related to a plurality of distinct SA communication services, and wherein the method comprises:
   identifying, for each of the SA communication services, a total number $n_1^j$ of network messages related to the SA communication service and processed by the IED;
   determining, for each of the SA communication services, a number $n_2^j$ of specific communication protocol elements within the respective number $n_1^j$ of identified network messages;
   determining, for each of the SA communication services, a number $n_3^j$ of elements with a changed data value within the respective number $n_2^j$ of protocol elements; and
   calculating, based on the numbers $n_i^j$ and the total processing time $t_p$ determined for each of the plurality of SA scenarios, parameter values $k_i^j$ of a processing time model for the IED.

3. The method according to claim 1, comprising:
   emulating a SA scenario by generating the corresponding network messages by a synthesizer.

4. The method according to claim 1, comprising:
   recording the network messages during a real SA event; and
   verifying previously calculated processing time model parameter values based thereupon.

5. The method according to claim 1, comprising:
predicting, based on the processing time model, the performance of the IED during SA application level load scenarios that have not been considered for the calculation of the model parameters.

6. An analyzing tool for analyzing a communication performance of an Intelligent Electronic Device (IED) configured to process network messages transferred with a Substation Automation SA communication service, wherein the analyzing tool comprises a control unit configured to, during each of a plurality of SA scenarios:
identify a number $n_1$ of network messages related to the SA communication service and processed by the IED;
determine a number $n_2$ of specific communication protocol elements within the number $n_1$ of identified network messages;
determine a number $n_3$ of elements with a changed data value within the number $n_2$ of specific communication protocol elements;
determine a processing time $t_p$ of the identified network messages at the IED; and
calculate SA communication service-specific parameters $k_1$, $k_2$, $k_3$ of a processing time model including the specific protocol element, based on the numbers $n_1$, $n_2$, $n_3$ and the processing time $t_p$ for each of the plurality of SA scenarios.

7. The method according to claim 1, comprising:
emulating a SA scenario by simulating a fault at the process level.

8. The method according to claim 2, comprising:
emulating a SA scenario by generating the corresponding network messages by a synthesizer.

9. The method according to claim 2, comprising:
emulating a SA scenario by simulating a fault at the process level.

10. The method according to claim 2, comprising:
recording the network messages during a real SA event; and
verifying previously calculated processing time model parameter values based thereupon.

11. The method according to claim 2, comprising:
predicting, based on the processing time model, the performance of the IED during SA application level load scenarios that have not been considered for the calculation of the model parameters.

12. The method according to claim 2, wherein the plurality of distinct SA communication services are selected from the group consisting of: MMS, GOOSE and SV.

13. The analyzing tool according to claim 6, wherein the IED is configured to process network messages related to a plurality of distinct SA communication services, and wherein the control unit is configured to:
identify, for each of the SA communication services, a total number $n_1^j$ of network messages related to the SA communication service and processed by the IED;
determine, for each of the SA communication services, a number $n_2^j$ of specific communication protocol elements within the respective number $n_1^j$ of identified network messages;
determine, for each of the SA communication services, a number $n_3^j$ of elements with a changed data value within the respective number $n_2^j$ of protocol elements; and
calculate, based on the numbers $n_i^j$ and the total processing time $t_p$ determined for each of the plurality of SA scenarios, parameter values $k_i^j$ of a processing time model for the IED.

14. A non-transitory computer-readable recording medium having a computer program recorded thereon that causes a computer to analyze a communication performance of an Intelligent Electronic Device (IED) configured to process network messages transferred with a Substation Automation (SA) communication service, the program causing the computer to perform operations comprising, during each of a plurality of SA scenarios:
identifying a number $n_1$ of network messages related to the SA communication service and processed by the IED;
determining a number $n_2$ of specific communication protocol elements within the number $n_1$ of identified network messages;
determining a number $n_3$ of elements with a changed data value within the number $n_2$ of specific communication protocol elements;
determining a processing time $t_p$ of the identified network messages at the IED; and
calculating SA communication service-specific parameters $k_1$, $k_2$, $k_3$ of a processing time model including the specific protocol element, based on the numbers $n_1$, $n_2$, $n_3$ and the processing time $t_p$ for each of the plurality of SA scenarios.

* * * * *